United States Patent [19]

Perrault et al.

[11] 4,379,204
[45] Apr. 5, 1983

[54] STUFFING TUBE

[75] Inventors: Frederick Perrault, Torrance; Raymond E. Perrault, Rancho Palos Verdes, both of Calif.

[73] Assignee: Whipple Patent Management Corporation, Sherman Oaks, Calif.

[21] Appl. No.: 259,916

[22] Filed: May 4, 1981

[51] Int. Cl.³ .............................................. H02G 3/22
[52] U.S. Cl. ................. 174/65 SS; 277/112; 277/235 R; 285/356
[58] Field of Search .................... 174/65 SS; 277/110, 277/112, 235 R, 164; 285/343, 353, 354, 356, 357, 158; 138/DIG. 8

[56] References Cited

U.S. PATENT DOCUMENTS

| | | | |
|---|---|---|---|
| 1,814,478 | 7/1931 | Metcalf | 285/356 X |
| 2,151,096 | 3/1939 | Freedlander | 277/235 X |
| 2,795,641 | 6/1957 | Rowell | 174/135 |
| 2,913,260 | 11/1959 | Givens | 285/158 |
| 3,058,762 | 10/1962 | Howe | 285/354 X |
| 3,082,470 | 3/1963 | Fork | 174/153 G X |
| 3,635,502 | 1/1972 | Burkhalter, Jr. | 285/354 X |

OTHER PUBLICATIONS

Naval Sea Systems Command Drawing No. 5001027, Sheets 1, 17, 20, 43.
Navy Bureau of Ships Drawing 9000-S6202-73980-C, Sheet 118.
Military Specification Sheet MIL-S-24235/9C (Ships), Dec. 15, 1970.
Military Specification Sheet MIL-S-24235/17 (Ships), May 21, 1975.
Drawing No. 5001027, MIL-S-24235.
Military Specification Sheet MIL-S-24235/2 (Ships), Jul. 18, 1967.
Military Specification MIL-P-16685D (Navy), Apr. 30, 1970.
Pamphlet "BACO Moulded Cable Packing", Oct. 1972, Baier & Ackerman, Inc., New York, N.Y.

Primary Examiner—A. T. Grimley
Assistant Examiner—D. A. Tone
Attorney, Agent, or Firm—Gausewitz, Carr, Rothenberg & Edwards

[57] ABSTRACT

This invention provides a stuffing tube for the decks and bulkheads of ships, which includes a tubular body having portions of two diameters interconnected by a tapered shoulder. An adapter having a tapered portion complementary to that of the tubular body fits inside, the adapter having a short cylindrical section dimensioned to fit over the cable. A seal comprising a strip of resilient material with an annealed wire core is wrapped around the cable and one end of it is engaged within the tapered adapter. The opposite end is engaged by a flat washer which has an inside diameter comparable to that of the cylindrical section of the adapter. A gland nut compresses the seal, pressing inwardly on the flat washer. Different cable sizes are accommodated within a single tubular body by varying the dimensions of the adapter, seal and flat washer.

23 Claims, 6 Drawing Figures

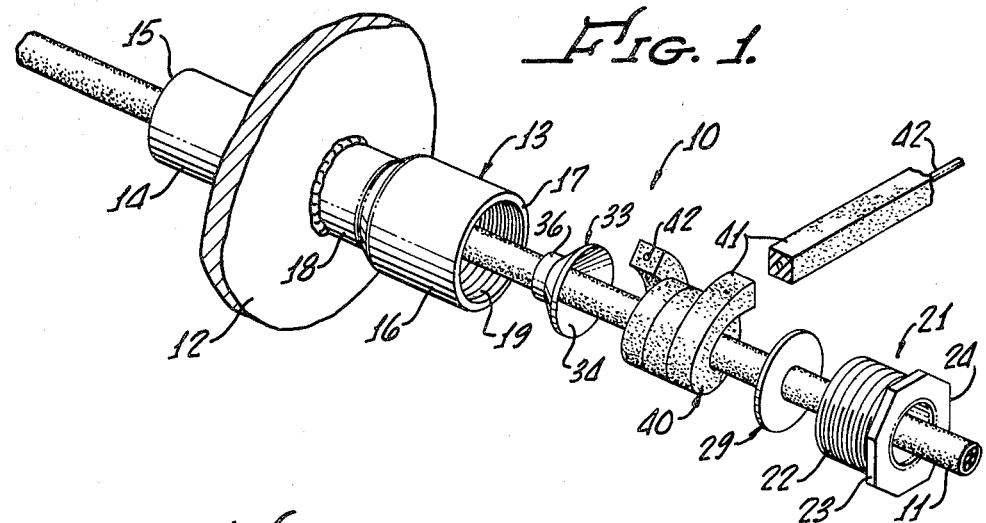
FIG. 1.
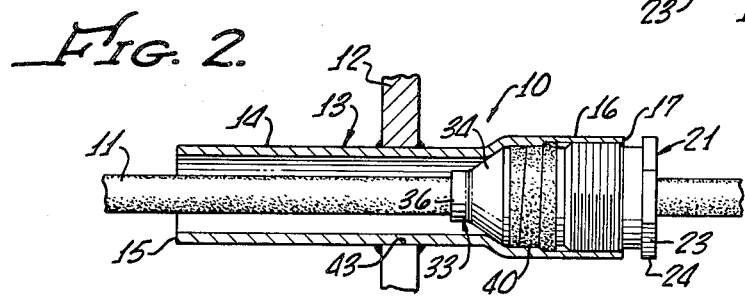
FIG. 2.
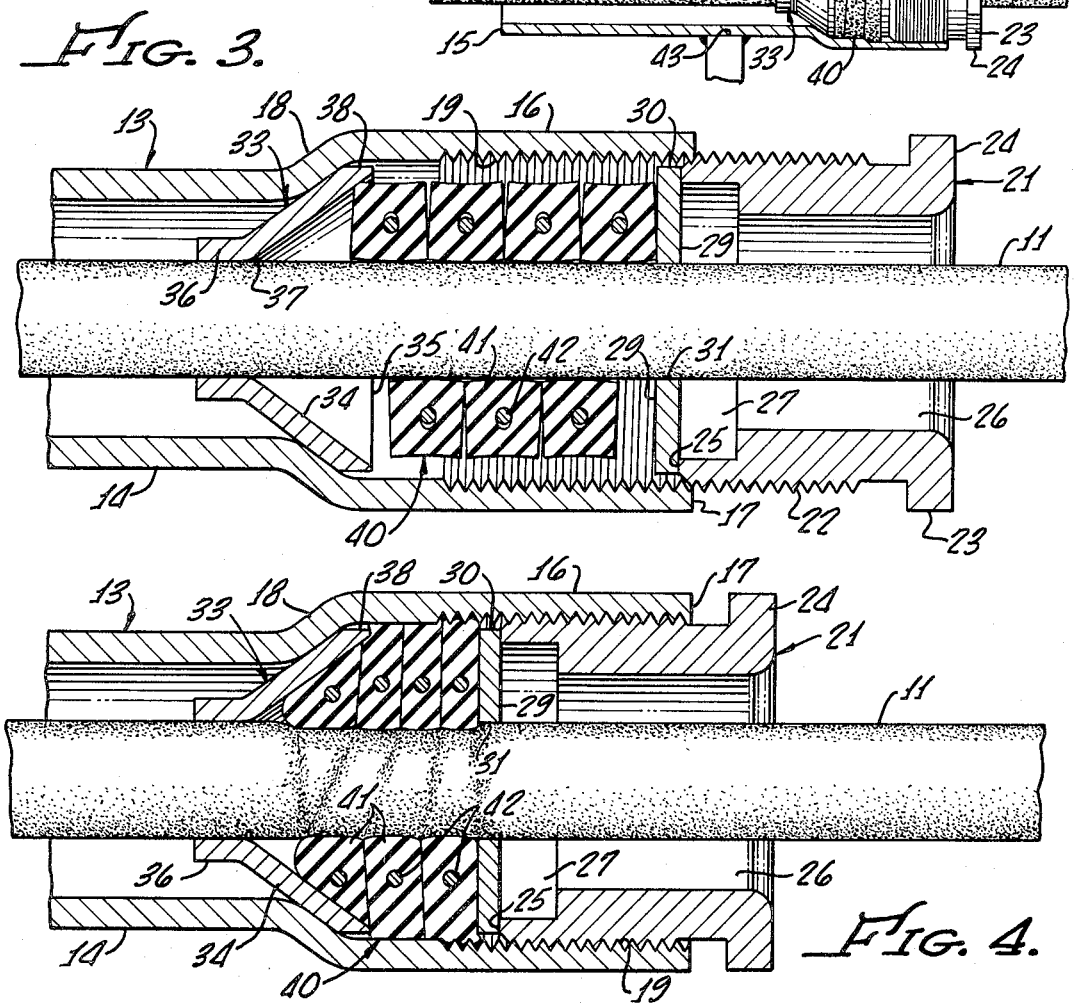
FIG. 3.
FIG. 4.

STUFFING TUBE

BACKGROUND OF THE INVENTION

The construction of naval ships calls for the use of stuffing tubes where electrical cables are extended through bulkheads and decks. These stuffing tubes include tubular bodies fitted through openings in the bulkheads and decks and welded into place. An asbestos composition seal is within the stuffing tube around the cable, and various machined parts are used to compress the seal so as to substantially prevent air flow from one side of the bulkhead or deck to the other. Inasmuch as the electrical cables come in many different diameters, a comparable number of sizes of tubular bodies has been necessary for conventional stuffing tubes. For example, twenty-three sizes of tube bodies have been required, with similar numbers of the internal parts making up the stuffing tube assembly. The large number of parts has added to the cost of the inventory to be maintained and made stuffing tube installations complex. In addition, when cable routing assignments are changed during ship construction, as occurs from time to time, changing the size of cable at tube bodies previously welded into place, it has been necessary to cut the tube bodies out of the deck and bulkheads and replace them with those of different sizes. This obviously is a very expensive and time-consuming operation.

Another problem arises in ship overhaul and refurbishing. This causes frequent change in the size of electrical cables, usually a reduction in size due to the different electrical requirements of modern electronic equipment. This has meant that the old tubular bodies have had to be cut out of the bulkheads and decks and replaced with new and different sized tubular bodies. Again, the cost has been very high and the time required has been excessive. Many prior stuffing tube installations also have a tendency to leak, requiring a great deal of time and expense in reworking to make them substantially airtight in accordance with specifications.

BRIEF DESCRIPTION

The present invention provides a simplified and improved stuffing tube that overcomes the difficulties noted above. It drastically reduces the number of parts by enabling a tubular body to accommodate several different cable sizes. The result has been a reduction in the number of sizes of tubular bodies, the most expensive components of the assemblies, from twenty-three to only nine. Other components, likewise, are reduced in inventory requirements. At the same time, an effective seal is obtained with a minimum effort and installation time is reduced. The entire stuffing tube assembly of this invention is more economically constructed than are prior designs.

The stuffing tube assembly includes a tubular body of two different diameters, the larger of which is internally threaded to receive the gland nut. A tapered section interconnects the portions of the two diameters. Inside of the stuffing tube is an adapter which is a frustoconical member with a short cylindrical section at its narrow end. The tapered part of the adapter engages the tapered shoulder of the tubular body which supports and reinforces the adapter. The cylindrical section fits over the cable to be accommodated. A seal, which comprises a strip of elastomeric material rectangular in cross section, with an annealed wire core, is wrapped around the cable and positioned between the adapter and a flat washer. The latter member, which is engaged by the gland nut, has an inside diameter the same as that of the cylindrical section of the adapter.

When the gland nut is tightened, the seal is compressed, forced inwardly toward the cable by the adapter and outwardly against the wall of the tubular body by the flat washer. The result is an effective, airtight seal.

Different sizes are accommodated within a single tubular body merely by utilizing adapters, washers, and sealing members of different dimensions. This enables a great reduction in the number of parts which must be stocked and also permits tubular bodies already welded in bulkheads to be used with cables of different sizes. The sealing strip can be cut to different lengths, as needed, and each size sealing strip can be used to seal several different sizes of cables. The packing space in the stuffing tube does not change much for different sizes of cables assuring an adequate amount of the sealing strip in all instances. No hazardous asbestos is used.

BRIEF DESCRIPTION OF THE DRAWINGS

FIG. 1 is an exploded perspective view of the stuffing tube assembly of this invention;

FIG. 2 is a longitudinal sectional view of the stuffing tube assembly;

FIG. 3 is an enlarged longitudinal sectional view of an end portion of the assembly, prior to tightening the gland nut;

FIG. 4 is a view similar to FIG. 3 but with the gland nut tightened to the fully assembled position;

DETAILED DESCRIPTION OF THE PREFERRED EMBODIMENT

Figure 5:
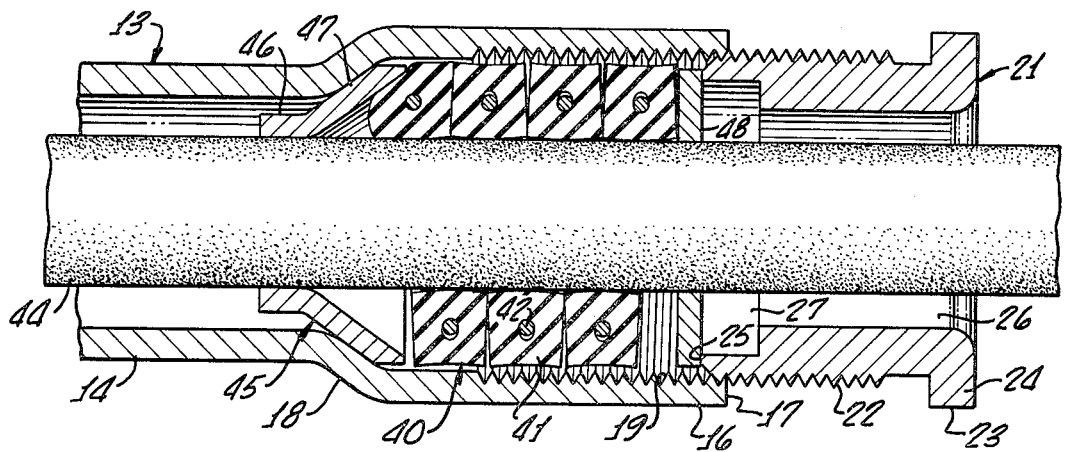
FIG. 5 is a view similar to FIG. 3 of the stuffing tube modified to accommodate a cable of larger size.

The stuffing tube assembly 10 shown in FIGS. 1-4 is for effecting a seal where an electrical cable 11 passes through a partition such as a bulkhead 12 of a ship. The assembly 10 includes a tube 13 which has a section 14 extending inwardly from one end 15, which is of a first constant diameter. An additional section 16 of a second and larger constant diameter extends inwardly from the opposite end 17. The section 16 is not as long as the section 14. These two sections are interconnected by a short frustoconical portion 18 which is at a 35° angle relative to the axis of the tube, and which fairs smoothly with the walls of the sections 15 and 16. An internal thread 19 extends inwardly of the end 17 for most of the length of the section 16 of the tube, but stops short of the tapered interconnecting shoulder 18.

A gland nut 21 of conventional design has an external thread 22 for meshing with the thread 19 of the tube. Wrenching surfaces 23 are formed on the periphery of a flange 24 at one end of the gland nut. An annular radial surface 25 is at the opposite end of the gland nut. A bore 26 extends most of the length of the gland nut from the end flange 24, with counterbore 27 extending inwardly from the opposite end surface 25.

In the assembly, the end 25 of the gland nut 21 bears against a flat washer 29. This washer has an outside diameter slightly less than the inside diameter of the tube section 16 so that it can move freely within the tube with its outer circumferential edge 30 adjacent the inner surface of the tube. The inner circumferential edge 31 of the washer 30 is substantially complementary to the cable with enough clearance so that it can slide over the cable in a similar manner.

Opposite from the washer 30 is an adapter 33 which has a frustoconical portion 34 tapering inwardly from one end 35 at the same angle as that of the interconnecting section 18 of the tube 13. In other words, the adapter portion 34 tapers at an angle of 35° relative to its axis. A short straight cylindrical portion 36 extends from the smaller end of the frustoconical portion 34 of the adapter 33. These sections of the adapter smoothly fair together, presenting a rounded corner 37 at their juncture. The inner wall of the cylindrical section 36 has the same diameter as the opening 31 through the flat washer 29, so that it is substantially complementary to the cable 11. The outside diameter of the cylindrical section 36 is less than that of the tube section 14 so that the cylindrical section is spaced from the wall of the tube. The outer peripheral edge 38 of the frustoconical portion 34 is given a cylindrical configuration and has the same diameter as that of the outer edge 30 of the flat washer 29.

Between the adapter 33 and the flat washer 29 is a seal 40. Preferably, the seal includes a strip 41 of a resilient elastomer, such as neoprene, of square cross section, which is cut to a length so that it can be wrapped a few turns around the cable, with one of its flat sides bearing against the cable. Inside the strip 41 at its axis is a ductile annealed steel wire 42. The latter element is important in enabling the seal 40 to be wrapped around the cable 11 without significant springback. Without the wire 42, the seal will not retain a helical shape and is so difficult to manage as to make it impractical for use as such a seal. However, with the ductile wire 42 inside of the neoprene strip 41, the seal can be wrapped into a helix around the cable and will stay in position, permitting assembly of the components of the stuffing tube.

In use of the stuffing tube of this invention, an opening 43 is cut through the bulkhead 12 within which the smaller diameter portion 14 of the tube 13 is positioned. After this, the periphery of the tube 13 is welded to the bulkhead, which both secures the tube to the bulkhead and seals around the tube. The components of the unit then are assembled to the position of FIG. 3. The adapter 33 is fitted in the tube 13 with its cylindrical part 36 circumscribing the cable 11 and facing toward the smaller diameter portion 14 of the tube. Adjacent its outer circumferential edge 38, the outside of the frustoconical portion 34 of the adapter 33 complementarily engages and is supported by the tapered portion 18 of the tube 13. The strip 41 of the seal 40 has a smaller outside diameter than that of the frustoconical portion 34 and at one end of its helix enters this part of the adapter. The opposite end of the seal 40 is engaged by the flat washer 29. The length of the seal 40 is selected so that one or two turns of the thread 19 are exposed when the seal is wrapped around the cable and assembled firmly into the tube section 16, along with the adapter 33 and washer 29. This permits the thread of the gland nut 21 to begin to mesh with the thread 19 of the tube.

The gland nut 21 then is tightened to bring the assembly to the position of FIG. 4. Normally the gland nut 21 is rotated to a predetermined torque which leaves the flange 24 of the gland nut spaced a short distance from the end surface 17 of the tube section 16. As this happens, the seal 40 is compressed between the adapter 33 and the flat washer 29. The frustoconical portion 34 of the adapter 33 confines the seal 40 at one end and causes it to be pressed inwardly toward the periphery of the cable 11.

As a result, the seal 40 produces an airtight seal around the surface of the cable. The compression force is transmitted through the frustoconical portion 34 of the adapter 33 to the tapered part 18 of the tube so that adapter is held securely in place without distortion. Also, the short straight cylindrical part 36 of the adapter 33 gives this part added strength to resist forces tending to open it up. Therefore, the adapter 33 is quite rigid so that it can serve its function of causing the seal 40 to firmly engage the periphery of the cable 11. The cylindrical section 36 provides a desirable area contact with the cable 11, assuring that the cable will not be cut or otherwise damaged by the adapter. The rounded corner 37 between the adapter portions 34 and 36 also avoids damage to the cable by always presenting a smooth surface to the cable. This holds true even if the adapter should experience distortion under some unusual overload condition.

The flat washer 29 at the opposite end of the seal 40 allows the seal to expand outwardly toward the inner surface of the section 16 of the tube 13. This permits an airtight seal to be effected between the outer part of the seal 40 and the wall of the tube. The flat washer is securely held against that flat end edge 25 of the gland nut 21 and is of sufficient thickness that it will not distort under the load imposed by the compressed seal. Thus, the stuffing tube assembly is readily put into service to seal the opening through the bulkhead 12 where the electrical cable 11 passes.

The stuffing tube arrangement is adapted to accommodate cables of different sizes within one tubular member. For example, as shown in FIG. 5, the cable 44 is larger than the cable 11 of the previously described embodiment. The selection of the cable 44 may occur as an original choice, or from a change in cable assignments during construction, requiring a larger cable at the location of the tube 13. Also, the different cable size may arise from ship refurbishing, during which it is necessary to remove the cable 11 to replace it with a cable of different dimension.

In the embodiment of FIG. 5, the adapter 33 is replaced by an adapter 45 which has a cylindrical end part 46 of larger diameter than the cylindrical end part 36 of adapter 33. The end part 46 is dimensioned to slip over and be generally complementary to the larger cable 44. The frustoconical portion 47 of the adapter 45 is at a 35° angle, as before.

Opposite from the adapter 45 is a flat washer 48, which has an inside diameter corresponding to that of the end part 46 of the adapter 45.

The same seal 40 may be used because there is enough annular space between the cable 44 and the wall of the tube section 16 to accommodate it. The length of the seal will be a little greater in the embodiment of FIG. 5 than it is in the previously described arrangement because it is wrapped into a helix of greater diameter.

The action of the stuffing tube is the same as before, as advancement of the gland nut 21 compresses the seal 40 between the flat washer 48 and the adapter 45, effecting a seal around the cable 44 and the inside wall of the tube.

Figure 6:
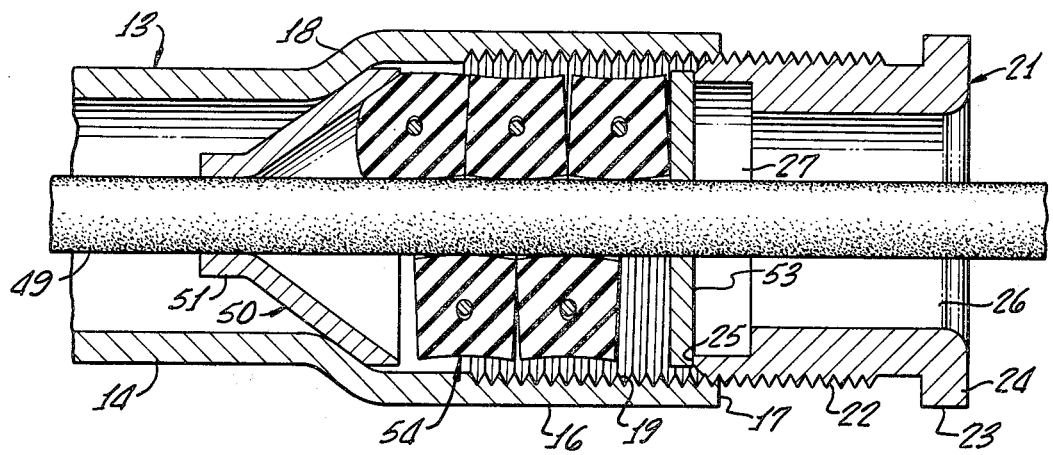
FIG. 6 is a view similar to FIG. 3 of the stuffing tube modified to accommodate a cable of smaller size.

The same tube 13 is shown accommodating a cable 49 in FIG. 6, which is of smaller diameter than the cable 11. Here the adapter 50 has a cylindrical end part 51 of reduced diameter, appropriate to fit over the cable 49. This means that the tapered part 52 of the adapter 50 is longer than before, but the same 35° taper is maintained. The flat washer 53 has an inside diameter proportioned similarly to the cylindrical part of the adapter. Also modified is the seal 54, which is larger in cross section so as to take up more space around the cable 49. The parts cooperate as before, as the gland nut is tightened and the seal is accomplished.

Just as a seal of larger cross section is used in the arrangement of FIG. 6, a seal of smaller cross section may be substituted in the event the cable is larger in diameter than that of the cable 44, shown in FIG. 5.

The adapter, seal and washer can be varied to suit different cable sizes for overhaul and refurbishing, as well as for new construction. When an old cable has been removed from the stuffing tube of a ship being updated, the tubular body may be left in place as a new cable is routed through it. An appropriate adapter, with seal and washer, will effectively seal around the new cable so that replacement of the tubular body is unnecessary.

The foregoing detailed description is to be clearly understood as given by way of illustration and example only, the spirit and scope of this invention being limited solely by the appended claims.

We claim:

1. A stuffing tube device for providing a seal around electrical cables or the like extended through bulkheads and decks of ships comprising:
   a tube of substantially uniform wall thickness having
      a first portion of a first diameter,
      a second portion of a second and larger diameter, and
      a shoulder between said first and second portions,
   a member having an interiorly and exteriorly tapered portion, a straight cylindrical section at the inner end of said tapered portion, and an opening therethrough adapted to receive an electrical cable or the like,
      the exterior of said tapered portion engaging said shoulder, washer means in said second portion,
   a threaded member adjacent said washer means,
      said second portion of said tube having threads at the outer end thereof meshed with the threads of said threaded member, whereby said threaded member can bias said washer means inwardly of said tube upon relative advancement of said threads,
   and a seal between said washer means and said member,
      one end of said seal engaging said washer means and the
      opposite end of said seal engaging said tapered portion,
         whereby upon such relative advancement, said seal is compressed for providing a seal around an electrical cable extending through said tubular member and around the wall of said second portion of said tubular member.

2. A device as recited in claim 1 in which said shoulder is frustoconical and complementary to a part of said tapered portion of said member.

3. A device as recited in claim 1 in which said seal comprises a strip of resilient material adapted to be wrapped around a cable extending through said tubular member.

4. A device as recited in claim 3 in which said seal includes a resilient elongated elastomeric member, and a ductile wire extending through said elastomeric member for holding said elastomeric member in a helical position wrapped around an electrical cable and preventing substantial springback thereof.

5. A device as recited in claim 4 in which said seal has a substantially square cross section.

6. A device as recited in claim 5 in which said elastomeric member is made of neoprene.

7. A device as recited in claim 1 in which said straight cylindrical section joins said tapered portion through a smoothly curved corner.

8. A device as recited in claim 7 in which the interior and exterior diameters of said member are substantially the same as the interior and exterior diameters of said washer means.

9. In combination with a cable extending through an opening in a partition, a stuffing tube arrangement for providing a seal between said cable and said partition, comprising
   a tube having a cylindrical end portion having an internal thread, and an inwardly tapered portion adjacent the inner end of said cylindrical end portion, the exterior of said tube being welded to said partition at said opening,
   a member having a tapered section having outer portions complementarily engaging said tapered portion of said tube, a cylindrical section extending from the narrow end of said tapered section, and a rounded corner between said tapered section and said cylindrical section,
      said cylindrical section being of smaller diameter than and spaced inwardly from said tube at said narrow end of said tapered section,
   an externally threaded hollow gland nut meshed with said thread of said tube and having an end received in said cylindrical end portion,
   a washer in said cylindrical end portion, one end of said washer being engaged by said end of said gland nut, and
   a seal in said cylindrical end portion, one end of said seal being engaged by said tapered section of said member, and the opposite end of said seal being engaged by the opposite end of said washer, said cable extending through said tube, said member, said seal, said washer, and said gland nut,
      said seal being compressed between said member and said washer, so that said seal is forced inwardly against said cable and outwardly against the wall of said cylindrical end portion for forming a seal with said cable and said tube.

10. The method of extending an electrical cable or the like through a partition in an airtight relationship therewith, comprising the steps of
    forming a tube so as to have a first part of a first substantially constant diameter, and a tapered shoulder at one end of said first part,
    securing the exterior of said tube to a partition so that said tube extends through said partition and is in an airtight relationship therewith on the exterior of said tube,
    forming an adapter member having a tapered part, and a substantially cylindrical part extending from the smaller end of said tapered part which is substantially complementary to an electrical cable to be extended through said partition, inserting said adapter member into said first part of said tube and bringing said tapered part of said adapter member into engagement with said tapered shoulder of said tube, extending said electrical cable through said tube and said adapter member, positioning a sealing member around said cable in said first part of said tube, with one end of said sealing member adjacent said tapered part of said adapter member, positioning a washer around said electrical cable and adjacent the opposite end of said sealing member, and then exerting a compressive force on said sealing member by pressing inwardly on said washer so that said sealing member is pressed against said cable by said tapered part of said adapter member for forming a substantially airtight seal therewith, and said sealing member is expanded outwardly against the inner periphery of said first part of said tube adjacent said washer for forming a substantially airtight seal with said tube.

11. The method as recited in claim 10 in which said tapered part of said adapter member is made to substantially the same taper as that of said shoulder of said tube.

12. The method as recited in claim 11 in which said tapered part and said tapered shoulder are made substantially frustoconical.

13. The method as recited in claim 10 in which said seal is so positioned around said cable by forming a strip of elastomeric material of a predetermined length, positioning a ductile wire within said elastomeric member, and then wrapping said elastomeric member around said cable in a helix so that said ductile wire causes said elastomeric member to retain a helical shape.

14. The method as recited in claim 13 in which said strip is cut to said predetermined length from a length of said strip greater than that which is so wrapped around said cable.

15. The method as recited in claim 14 in which said strip is made to a substantially rectangular cross section, and one of the flat sides of said strip is positioned adjacent said cable.

16. The method as recited in claim 10 in which for so exerting a compressive force on said seal a thread is formed on the inner periphery of said first part of said tube, a gland nut is formed with a bore, an external thread and a wrenching surface, said external thread is meshed with said thread on the inner periphery of said tube, said cable is extended through said bore, and said gland nut is advanced so as to so press inwardly on said washer.

17. The method as recited in claim 10 in which said cylindrical part of said adapter is made to a transverse dimension less than that of said tube at the narrow dimension of said tapered shoulder so that there is a space between said cylindrical part of said adapter and said tapered shoulder.

18. The method as recited in claim 17 in which said tube is formed to have a second part of a second substantially constant diameter extending from the narrow end of said tapered shoulder, and said second part of said tube is welded to said partition for so securing said tube to said partition.

19. The method of converting a stuffing tube transmitting a first cable of a first diameter through a partition to the transmission of a second cable of a second diameter different from that of said first diameter, which tube includes a first end part of a first diameter, and a tapered shoulder at the inner end of said first end part, comprising the steps of removing said first cable from said tube, extending said second cable through said tube, making an adapter with a tapered part, and a cylindrical part at the narrow end of said tapered part, said cylindrical part being made substantially complementary to the exterior of said second cable, positioning said adapter in said tube so that said second cable is received in said adapter and said tapered part of said adapter engages said tapered shoulder of said tube, positioning a sealing member around said second cable in said first part of said tube with one end of said sealing member being adjacent said tapered part of said adapter, positioning a washer in said tube adjacent the opposite end of said sealing member, and exerting a compressive force on said sealing member by pressing inwardly on said washer so that said tapered part of said adapter forces said sealing member against the surface of said cable, and said washer forces said sealing member outwardly against the inner periphery of said first part of said tube.

20. In combination with a tubular body for extending through a bulkhead or deck of a ship, said tubular body having an internal thread at one end and an internal shoulder inwardly of said one end, a hollow gland nut for meshing with said thread, a washer engageable by said gland nut, and an electrical cable extending through said tubular body, said gland nut and said washer, a sealing arrangement for said electrical cable comprising a tubular member having a tapered part, and a relatively short cylindrical part at the narrow end of said tapered part, said member being receivable in said tubular body with outer portions of said tapered part in engagement with said internal shoulder, said cylindrical part having a smaller diameter than that of said tubular body adjacent said shoulder, whereby when said tapered part so engages said internal shoulder said cylindrical part is spaced from the wall of said tubular body, said cable being receivable in said tubular member, and a seal adapted to be wrapped around said cable, said seal including an elongated elastomeric member, and a ductile wire inside said elastomeric member for causing said elastomeric member to retain a helical shape imparted to it, whereby said elastomeric member can be wrapped around said cable and given a generally helical shape between said tapered part and said washer, and compressed upon advancement of said gland nut for sealing around said cable and along the interior of said tubular body.

21. In combination with a tubular body for extending through a bulkhead or deck of a ship, said tubular body having an internal thread at one end and an internal shoulder inwardly of said one end and tapering toward the opposite end of said tubular body, a hollow gland nut meshed with said thread so that one end of said gland nut is received in said one end of said tubular body, a washer in said tubular body adjacent said one end of said gland nut, and an electrical cable extending through said tubular body, said gland nut and said washer, a sealing arrangement for said cable comprising a tubular member received in said tubular body and having a first part extending inwardly from one end of said tubular member and tapering to a location intermediate the ends of said tubular member from a relatively large diameter adjacent said one end thereof to a relatively small diameter at said intermediate location, at least the outer portion of the exterior of said first part substantially complementarily engaging said internal shoulder, and a second part extending from said first part at said intermediate location to the opposite end of said tubular member, said second part being cylindrical, said second part having a smaller diameter than that of said tubular body adjacent said shoulder so that said second part is spaced from the wall of said tubular body, said cable extending through said tubular member and being relatively closely received in said second part, and a deformable sealing member surrounding said cable and engaging said first part and said washer, said sealing member being compressed by said gland nut through said washer and by said first part so that said sealing member makes firm engagement with said cable and the wall of said tubular body to effect a seal.

22. A device as recited in claim 21 in which said sealing member comprises an elongated elastomeric element wrapped around said cable in a generally helical pattern, and a ductile wire within said element for enabling said element to retain said pattern prior to being so compressed.

23. A device as recited in claim 22 in which said element is substantially rectangular in cross section when uncompressed, and said ductile wire is substantially at the center of said element.

* * * * *